(12) United States Patent
Ballare

(10) Patent No.: US 6,208,329 B1
(45) Date of Patent: *Mar. 27, 2001

(54) SUPPLEMENTAL MOUSE BUTTON EMULATION SYSTEM, METHOD AND APPARATUS FOR A COORDINATE BASED DATA INPUT DEVICE

(75) Inventor: Daniel E. Ballare, Colorado Springs, CO (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/696,046

(22) Filed: Aug. 13, 1996

(51) Int. Cl.⁷ ........................................................ G09G 5/00
(52) U.S. Cl. .............................................................. 345/173
(58) Field of Search ...................... 345/173, 178, 345/2

(56) References Cited

U.S. PATENT DOCUMENTS

| | | | |
|---|---|---|---|
| 4,686,332 | 8/1987 | Greanias et al. | 178/19 |
| 4,806,709 | 2/1989 | Evans | 178/19 |
| 4,914,624 | * 4/1990 | Dunthorn | 345/173 |
| 5,327,161 | * 7/1994 | Logan et al. | 345/173 |
| 5,376,946 | 12/1994 | Mikan | 345/157 |
| 5,379,057 | * 1/1995 | Clough et al. | 345/2 |
| 5,428,367 | * 6/1995 | Mikan | 345/173 |
| 5,541,372 | * 7/1996 | Baller et al. | 345/173 |
| 5,696,535 | 12/1997 | Rutledge et al. | 345/156 |
| 5,825,352 | 10/1998 | Bisset et al. | 345/173 |

FOREIGN PATENT DOCUMENTS

| | | | |
|---|---|---|---|
| 0609021 | 8/1994 | (EP) | G06K/11/16 |
| 0698858 | 2/1996 | (EP) | G06K/11/16 |
| 2266038 | 10/1993 | (GB) | G06F/3/033 |
| 034634 | 7/1988 | (JP) | G06F/3/033 |
| 9611435 | 4/1996 | (WO) | G06F/3/033 |

OTHER PUBLICATIONS

Electronic Design, vol. 43, No. 26, Dec. 16, 1995; p. 98, 10, 104 XP000551901; B. Trunck. Integrating Digital Pens and Finger Touch.

* cited by examiner

*Primary Examiner*—Jeffery Hofsass
*Assistant Examiner*—John Tweel, Jr.

(57) ABSTRACT

A system for emulating a mouse button event via an absolute coordinate input device. The system includes a computer having an operating system capable of receiving mouse type relative coordinate input commands from an absolute coordinate input device adapted to generate coordinate data in response to a finger touch down event. A controller is operably connected to the coordinate input device and adapted to resolve left and right mouse button touch down events and respective coordinate data for such events.

13 Claims, 5 Drawing Sheets

SUPPLEMENTAL MOUSE BUTTON EMULATION SYSTEM, METHOD AND APPARATUS FOR A COORDINATE BASED DATA INPUT DEVICE

STATEMENT UNDER 37 CFR 1.71(D) AND (E)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to coordinate based data input devices and more particularly related to a method and apparatus for emulating a supplemental mouse button, for example, a right mouse button or other non-primary feature selection button, in a touch-type coordinate based data input device.

BACKGROUND AND OBJECTS OF THE INVENTION

Various methods and apparatuses are known in the art for facilitating the movement of a cursor to a point on the display of a computer or the like. Such methods and apparatuses are useful in assisting electronic device users (such as users of general purpose or dedicated computers) in selecting text, graphics, or menus for subsequent manipulation.

Coordinate based input devices include relative coordinate devices such as mice, track balls and absolute coordinate devices including digitizing tablets, touch screens, and touch pads. A mouse is a hand-held device which typically has between one and three feature buttons (physical electrical switches) for selecting different features related to or useful to a coordinate selected. The mouse buttons are typically arranged horizontally and referred to as left, right and middle mouse buttons. Digitizers and touch screens are utilized in a similar manner and most generally employ either an active or passive stylus. Where an active stylus is employed one or more buttons located on the stylus may be actuated so as to allow mouse button-type feature selection.

Features available for mouse selection can be broken down into the following categories: (a) primary features which are most commonly supported; (b) secondary features which are often supported yet are less common than primary features; and (c) tertiary features which are sometimes supported yet are less common than secondary features.

In the case of a single button mouse, primary features are the only available features. Single button mouse users typically select these features via the index finger pushing the single mouse button.

In the case of a two button mouse, both primary and secondary features are available. A typical right handed user makes primary feature selection via the index finger pushing the left mouse button. In addition, said user makes secondary feature selection via the long finger pushing the right mouse button.

In the case of a three button mouse, primary, secondary and tertiary features are available. A typical right handed user makes primary feature selection via the index finger pushing the left mouse button. In addition, said user makes secondary feature selection via the third finger pushing the right mouse button. Finally, said user makes tertiary feature selection via the long finger pushing the middle mouse button.

Note that users have the option of orienting mouse buttons differently than stated above. However, for the remainder of this document, left mouse button input will be associated with primary feature selection, right mouse button input will be associated with secondary feature selection and middle mouse button input will be associated with tertiary input selection.

Where a passive stylus is utilized other means for selecting mouse button-type features must be employed. Additionally, in absolute coordinate data input devices an initial contact is interpreted as primary mouse (e.g., left mouse button) activation. For example, Calder, et al., U.S. Pat. No. 5,432,531, teaches a coordinate processor capable of locking a cursor position and allowing differentiation between cursor movement from button click commands without requiring a manually operable push button. However, the Calder, et al., teaching does not disclose means for issuing relative coordinate device right mouse button commands.

Systems capable of emulating relative coordinate device right mouse button commands have been disclosed. For example, Ward, et al., U.S. Pat. No. 5,491,495, teaches a system for simulating a mouse by displaying a mouse icon overlay so as to allow a user to select a coordinate with a stylus and then select a mouse button by moving the stylus to the mouse icon overlay. However, the Ward, et al., system utilizes relative coordinate location of the stylus input based upon a graphical simulacrum of a mouse. Therefore, the Ward, et al., system requires (a) additional processor time to process the mouse icon display, (b) an icon which covers a viewable sized area of the display, and (c) a user to drag the icon into position rather than allowing a user to simply point and act on the coordinate desired.

It is, therefore, a primary object of the present invention to provide touch screen and touch pad users with full mouse-like input. Likewise, it is another object of the present invention to provide a system which allows right mouse emulation with touch screens and touch pads. Further, it is another object of the present invention to provide a system which performs without degrading computer performance. It is a still further object of the present invention to provide a system which allows both point as well as drag-and-drop selection. Yet another object of the present invention is to provide a system which does not impede the viewable area of a display during operation.

SUMMARY OF THE INVENTION

The present invention provides right mouse button emulation, in addition to cursor or pointer position data and left mouse button emulation, with an absolute coordinate touch-based input device. The present invention discloses a system for receiving input from fingers and a method for providing right mouse button emulation input to a program capable of receiving input from a mouse. The system includes a touch screen or touch pad adapted to receive input from a finger or fingers for generating coordinate data in response to a finger, a right mouse button selector in association with the touch screen for determining whether a user has selected a right mouse button feature.

Right or left mouse button selection input may be distinguished by one of two methods according to the present invention. In a first aspect of the present invention, the system determines whether the touch input generates right or left mouse button data according to the number of touch events on the touch screen. In this embodiment, for example, a single touch down event may be associated with left mouse button selection and two consecutive touch down events may be associated with right mouse button selection. Similarly, a third mouse button selection may be made by three consecutive touch down events.

In a second aspect of the present invention, the system determines whether the touch input generates right or left mouse button data according to the strength of the signal produced by the finger or fingers. The signal output by the touch screen surface will be greater when two fingers touch down simultaneously as compared to when one finger alone touches down. In this embodiment, for example, the Electrical signal produced by a single finger touch down may be associated with left mouse button selection and the electrical signal corresponding to two fingers touching down simultaneously may be associated with right mouse button selection. Similarly, a third mouse button selection may be made by the simultaneous touch down of three fingers.

BRIEF DESCRIPTION OF THE DRAWINGS

A preferred embodiment of the present invention is described hereafter, by way of example only, with reference to the accompanying drawings in which.

DETAILED DESCRIPTION

The following co-pending and co-owned U.S. patent applications are incorporated herein by reference: (1) Cancellation of Common-Mode Signals in Digitizing Tablet, U.S. patent application Ser. No. 08/192,078 (filed Feb. 4, 1994); and (2) Compensation of Stylus Signals in Digitizing Tablet, U.S. patent application Ser. No. 08/286,720 (filed Aug. 5, 1994). In the interest of providing a full and complete disclosure there is annexed hereto, as Appendix A, a copy of the source code of a preferred embodiment of the present invention.

In an exemplary embodiment right mouse button emulation may be provided in a system including, for example, the SYM93C2000 WriteTouch™ Interface Controller. This controller is available from Symbios Logic, Colorado Springs, Colo. The WriteTouch™ system is capable of finger touch events by biasing an active indium tin oxide sensor with a voltage and measuring the additional currents required to feed the added finger capacitance. Differences in corner currents reveals the location of the extra charge required directly under the finger. The sensor panel includes a glass writing surface with an under coating of indium-tin-oxide (ITO). Preferably a polyester spall shield is attached over the ITO coating in order to prevent shattering if the glass is broken. The underside of the shield is also coated with a grounded ITO layer in order to shield the sensor from LCD electrical noise. The top layer of the glass writing surface is provided with a grounded fine grid ITO coating pattern in order to eliminate hand effects. The active ITO layer is slightly resistive and divides the finger current among four corner wires. The corner current signals carried by these wires are proportional to the ITO conductivity between each individual corner and the finger location.

Figure 1:
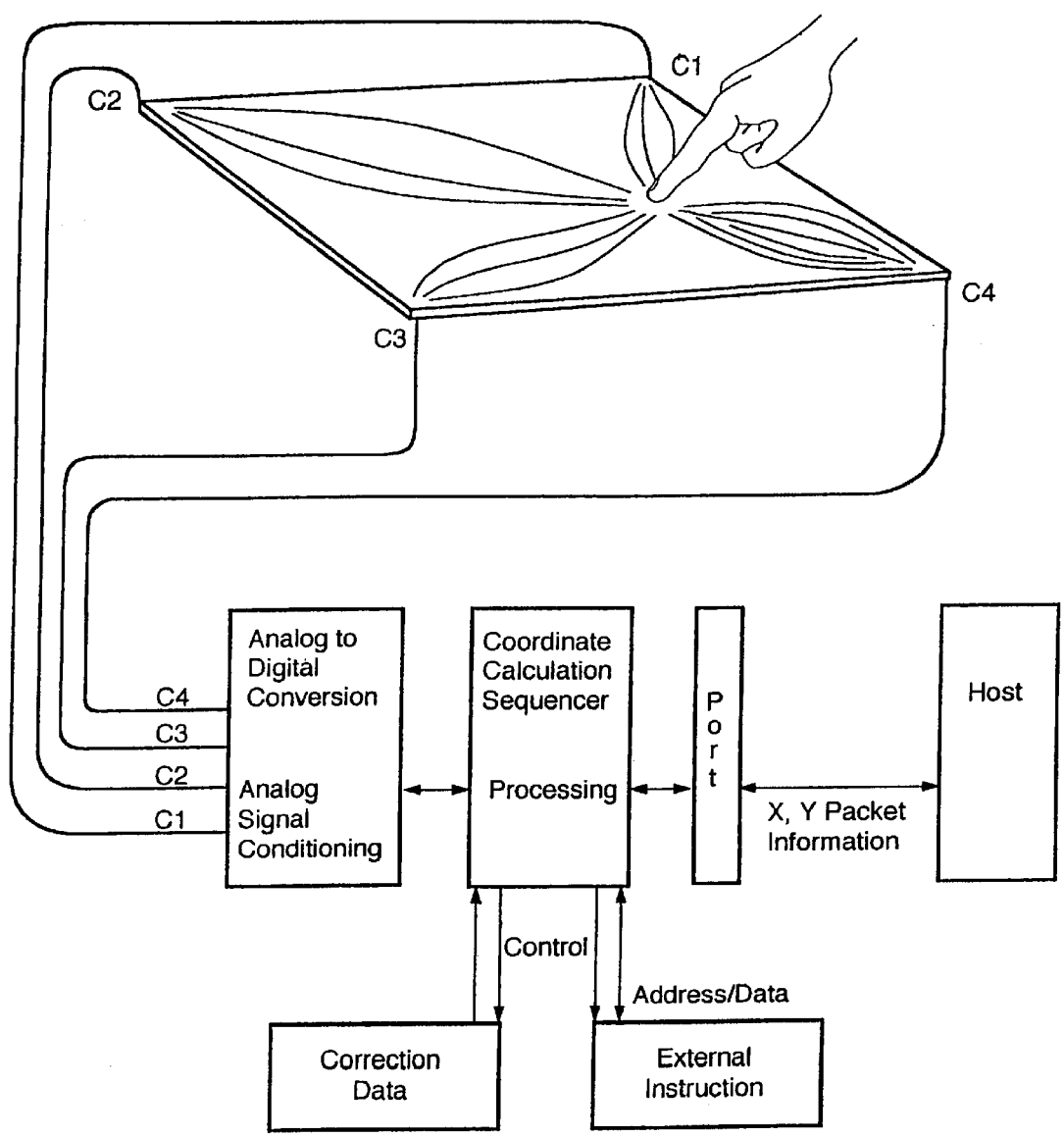
FIG. 1 is a diagrammatic illustration of a coordinate-based touch input operating as a system and as an embodiment of the present invention.

The corner current signals are amplified, filtered and rectified (for example, as illustrated in FIG. 1; C1, C2, C3, and C4). Finger location is then determined by subtracting the normalized corner currents in pairs in order to separately obtain x and y coordinates. A controller may then calibrate the x, y coordinates using data preferably specific to each sensor panel (this removes edge effects and non-linearities due to ITO coating variations). Sensor-specific calibration data may be maintained in non-volatile RAM (NVRAM) preferably in the panel cable rather than the controller so as to allow panel replacement. A single serial data line may be utilized to connect the controller to the CPU. A software driver may be utilized to process the data from the controller and, if appropriate, provide the data to an application program to determine whether to use the data to display digital ink via an LCD graphics controller or to use the data as control information.

While the WriteTouch™ system provides a currently preferred implementation of the system of the present invention, it will be appreciated, a system of the present invention may be assembled which utilizes a membrane, infrared, electromagnetic, or resistive based touch screen sensors or the like.

The source code of a driver program for use with Microsoft Windows 95 is appended hereto as Appendix A. This program, by way of example only, may be utilized to implement the system of the present invention where a general purpose computer running Windows 95 is utilized with the WriteTouch™ system. It will be appreciated that the invention of the present invention may be implemented with other operating systems and, likewise, with dedicated computers.

In operation, an exemplary embodiment of the present invention may be constructed with a computer, for example, having an IBM PC type architecture and a touch screen connected to the computer as an I/O device. The touch screen system may be, for example, a Symbios Logic™ SYM93C2000 controller, a Scriptel Corporation (Columbus, Ohio) electrostatic sensor panel for the WriteTouch™ system, and a software driver to interface the SYM93C2000 to an operating system such as Microsoft Windows 95. Operation of the SYM93C2000 (WriteTouch Interface Controller, herein after "WTIC") is depicted in FIG. 1. The computer, for example, may operate application environment software such as Microsoft WinPad in conjunction with an additional driver such as set forth in Appendix A.

Figure 2A:
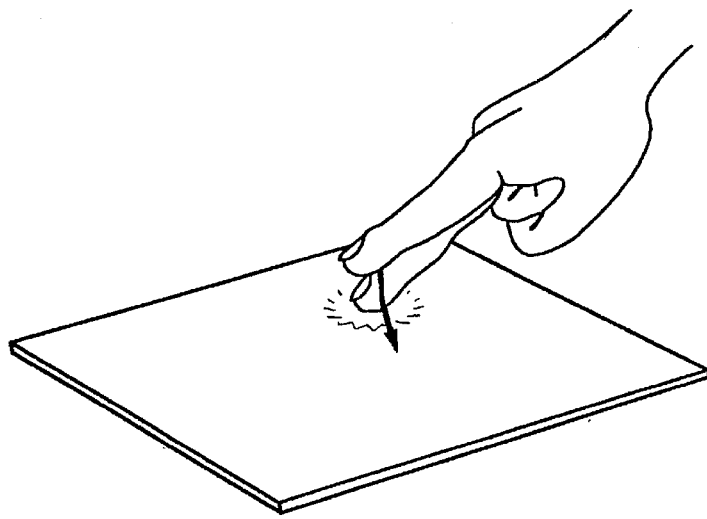
FIGS. 2A and 2B are diagrammatic perspective views illustrating a first embodiment of a system of the present invention based on a touch counting embodiment of the present invention.
Figure 2B:
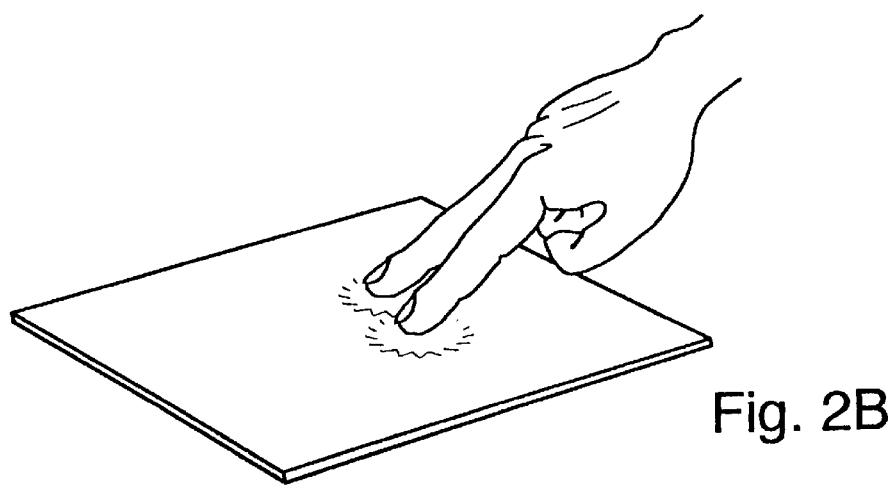
Figure 3:
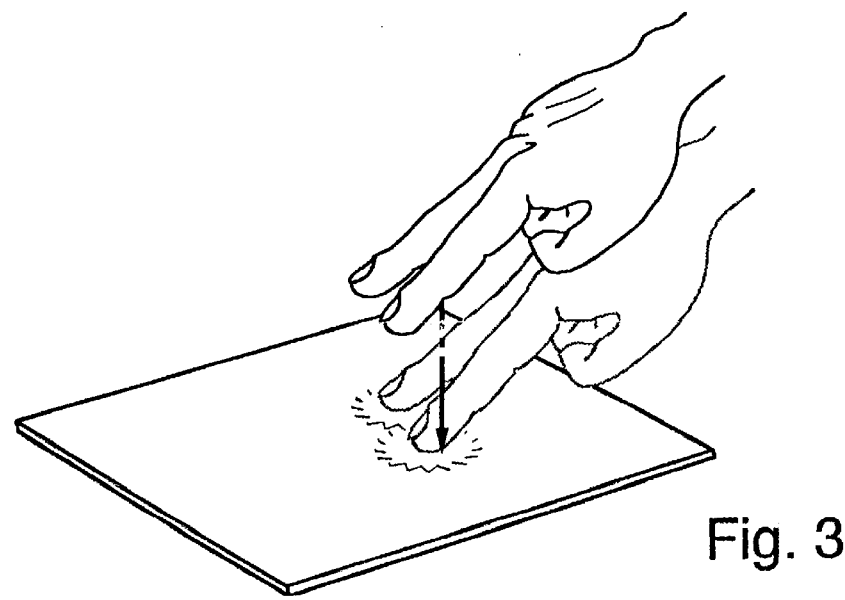
FIG. 3 is a diagrammatic perspective view illustrating a second embodiment of a system of the present invention based on a touch strength embodiment of the present invention.
Figure 4:
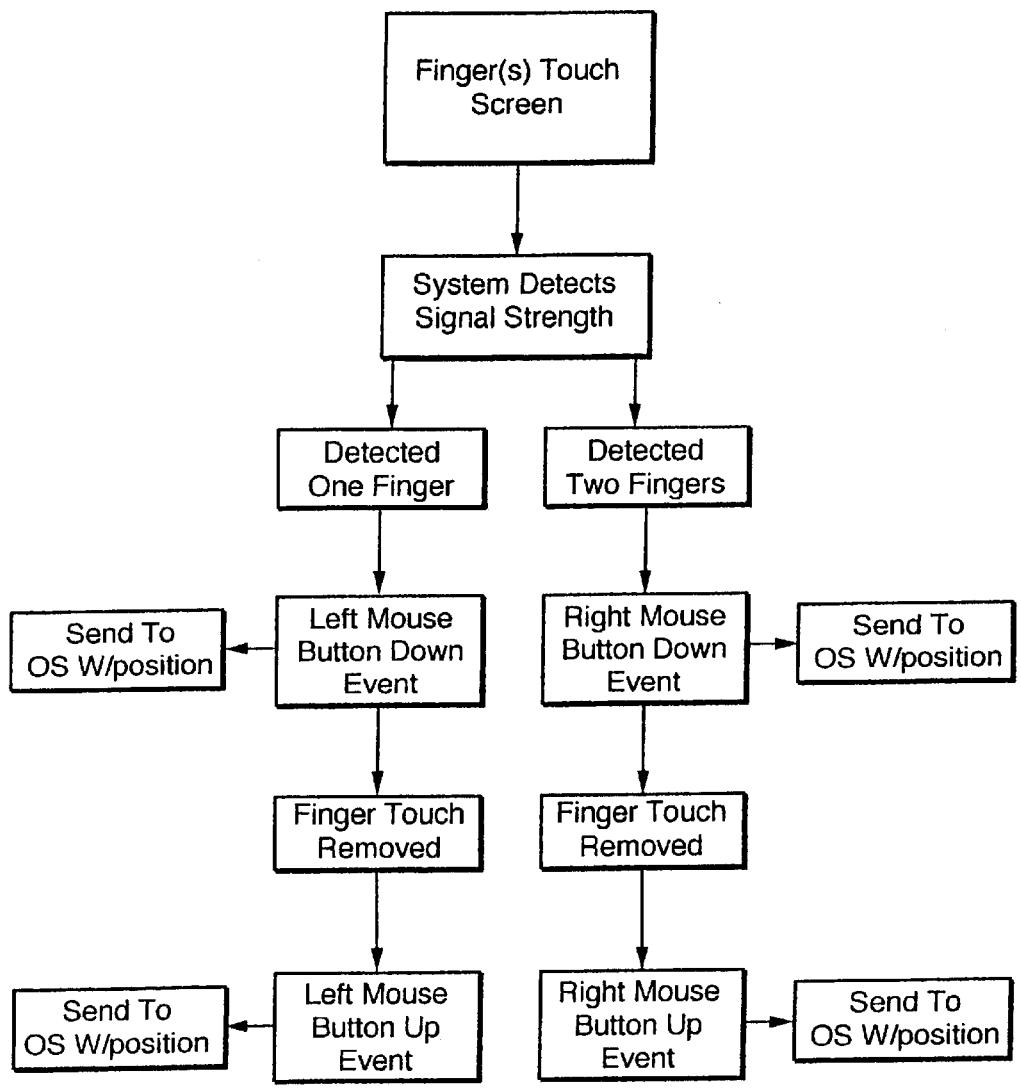
FIG. 4 is a flow chart illustrating the basic operation of a preferred embodiment of the present invention.
Figure 5:
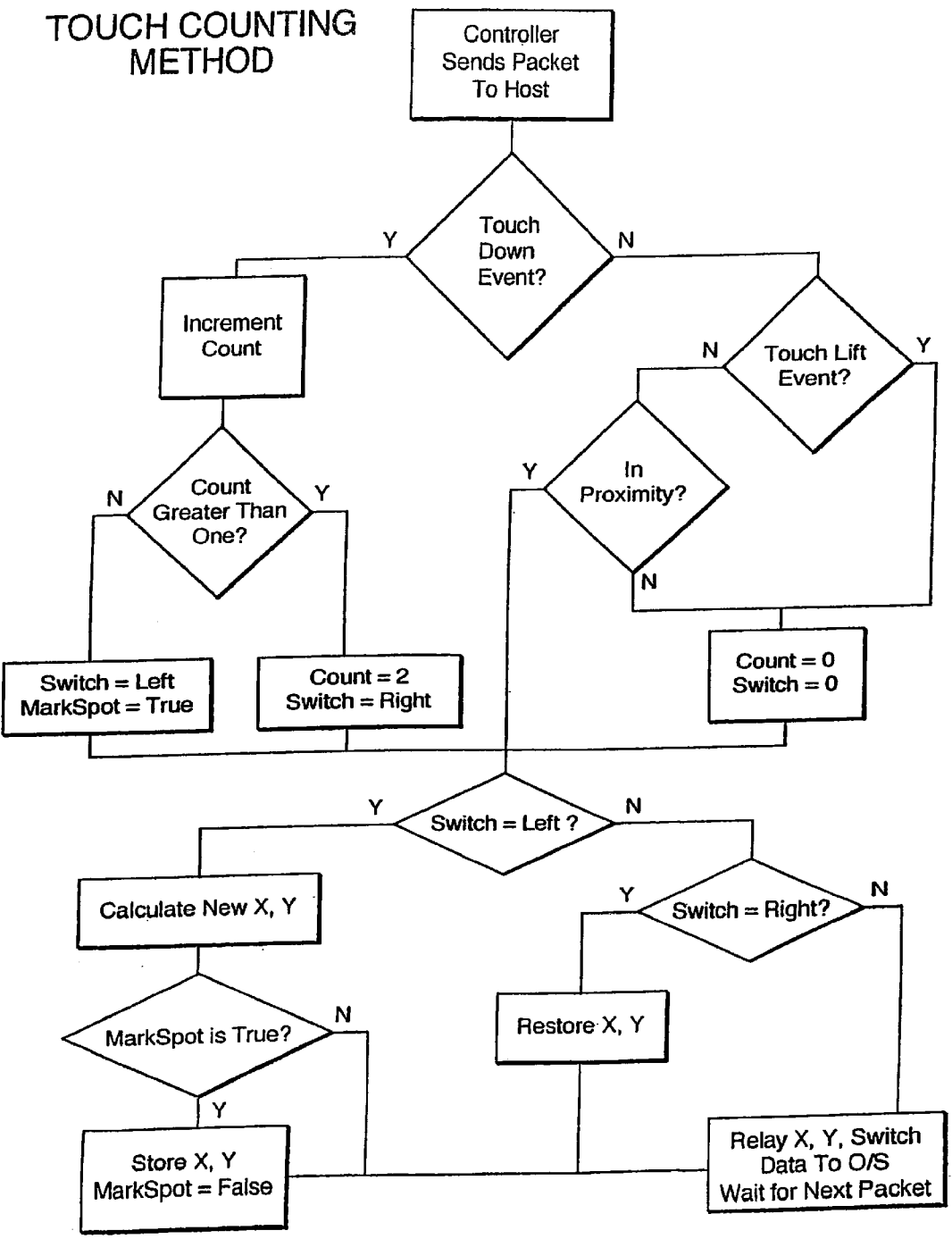
FIG. 5 is a flow chart illustrating the basic operation of an embodiment illustrated in FIGS. 2A and 2B wherein touch counting is utilized.
Figure 6:
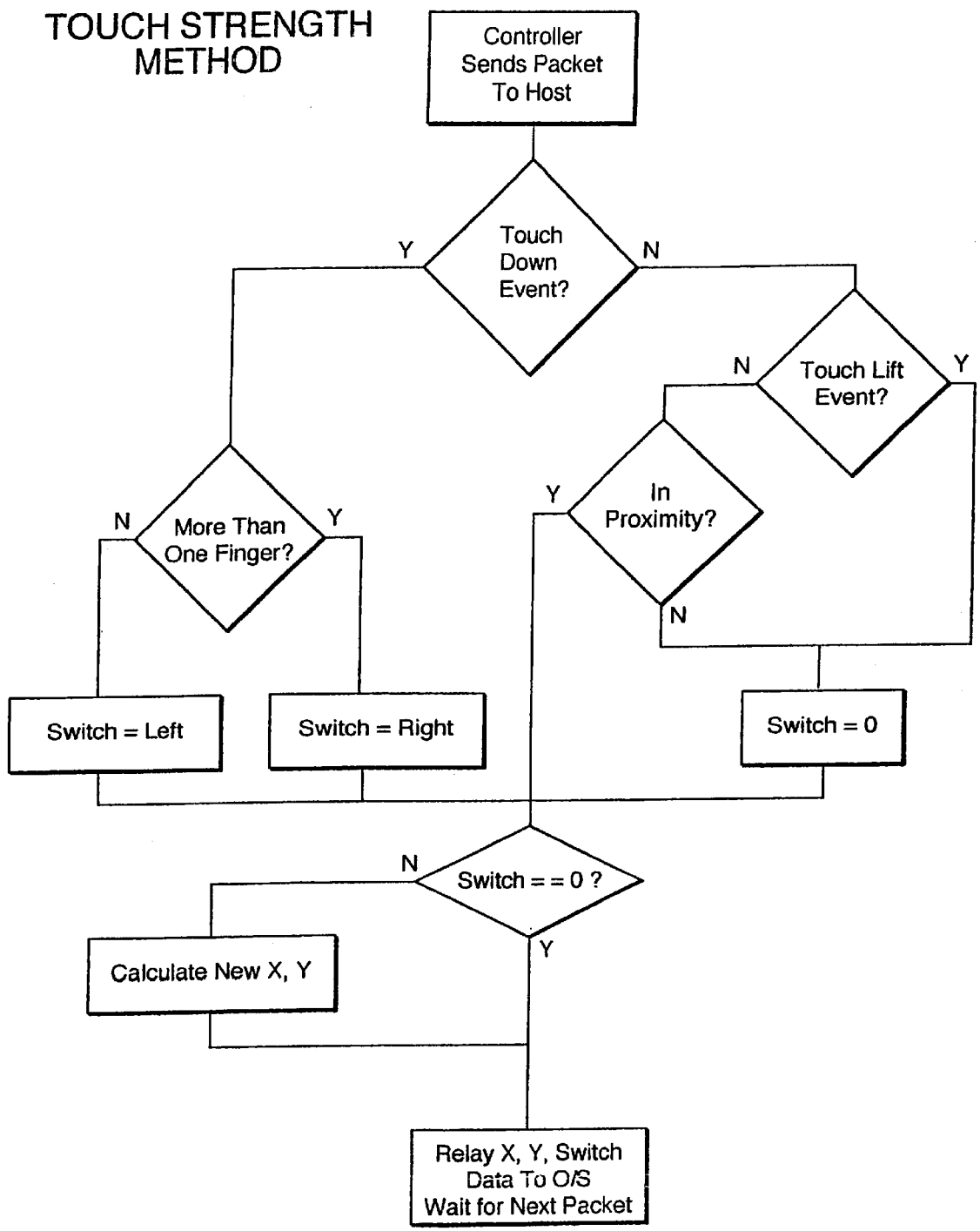
FIG. 6 is a flow chart illustrating the basic operation of an embodiment illustrated in FIG. 3 wherein touch strength is utilized.

Appendix A is a source code driver program (written in C programming language) which allows right mouse button emulation via touch counting (FIGS. 2A, 2B, and 5). With a firmware and driver alterations right mouse emulation may be obtained via touch strength (FIGS. 3, 4, and 6). In either embodiment a user of the system of the present invention may access full mouse type input features, including the hereto before unavailable right mouse button features, with a touch screen.

FIGS. 2A, 2B, and 3 illustrate the manner of using the touch input system according to the present invention to selectively generate left or right mouse button information. FIGS. 2A and 2B illustrate a first embodiment according to the present invention wherein left and right mouse button events may be selected by a touch counting method. To generate mouse button data, a finger is placed on the sensing plane, as shown in FIG. 2A. If a second finger is subsequently placed on the sensing plane, e.g., within a predetermined or preselected time period measured from the touch down of the first finger, as depicted in FIG. 2B, two touch counts are detected and a right mouse button down event is sent to the host computer along with the X-Y position of the touch down. Upon removal of the fingers, a right mouse button up event is sent to the host computer. If the second finger is not subsequently placed on the sensing plane, a left mouse button down event is sent to the host computer along with the X-Y position of the touch down. Upon lifting of the finger, a left mouse button up event is sent to the host computer. Where three button mouse emulation is desired (not shown), the tertiary or center mouse button events can be similarly obtained by the sequential placement of three fingers on the sensing plane in like manner to produce a touch count of three.

FIG. 3 illustrates a second embodiment according to the present invention wherein left and right mouse button events may be selected by determining touch strength wherein touch strength is a function of the number of fingers placed on the sensing plane. To generate mouse button data, one finger may be placed on the sensing plane (not shown), or two fingers may be simultaneously placed on the sensing plane as shown in FIG. 3. If two fingers are simultaneously placed on the sensing plane as depicted in FIG. 3, a touch strength associated with the presence of two fingers on the sensing plane is detected and a right mouse button down event is sent to the host computer along with the X-Y position of the touch down. Upon removal of the two fingers, a right mouse button up event is sent to the host computer. If only one finger is placed on the sensing plane, a left mouse button down event is sent to the host computer along with the X-Y position of the touch down. Upon lifting of the one finger, a left mouse button up event is sent to the host computer. Where three button mouse emulation is desired (not shown), the tertiary or center mouse button events can be similarly obtained in like manner by the simultaneous placement of three fingers on the sensing plane, thus generating an even higher touch strength.

Where touch counting is to be monitored by the system (FIG. 5) the driver of an exemplary embodiment may first cause the WTIC to send a packet to the host computer. The system then determines whether a touch down event has occurred. The system also determines whether a touch lift event has occurred. A counter is incremented for each touch down event. The counter is reset to zero for each touch lift event. If a touch down event causes the counter to exceed a count of one, then right mouse button data is sent to the operating system (O/S) along with x, y data from the previous touch down event.

Where touch strength is to be monitored by the system (FIG. 6) the firmware may be modified to monitor touch strength from the relative strength and proximity of the output of the touch screen. In such an embodiment the WTIC sends a new packet to the host and determines whether a touch down event has occurred. If a touch down event has occurred a determination is then made as to whether the touch down event included more than one finger in proximity to another then new x, y data is calculated and relayed to the operating system along with right mouse button switch data.

Thus, there has been described by way of example two embodiments of the present invention which obtain at least all of the objects of the present invention. It will, however, be appreciated the present invention is equally applicable to other absolute position pointing devices, operating systems, and computers.

APPENDIX "A"

SOURCE CODE PROVIDED UNDER 37 CFR 1.96(a)(2)(i)

```
[[PATENT.C : 4125 in PATENT.C]]
   static int TouchCount;
   static BOOL MarkSpot;
   static int MarkBarrelX;
   static int MarkBarrelY;
   static int EmulateBarrel;
DWORD BuildTouchpkt(LPDRV_PENPACKET 1ppp) // Handles normal touch mode.
{
static WORD xyunlocked = 0;
static WORD touchDown;
DWORD ret_val;
   ret_val = FF_SUCCESS FF_PENPACKET;
   if(ByteBuffer[Z_HIGH_BYTE] & 0x10) // touch down event occurred.
   {
      if(BeepEnabled)
      Beepon(0x100);
      PenStatus &= ·0x1;
      touchDown = 1;
      markX = (int)last_X;
      markY = (int)last_Y;
      TouchCount++;
      if(TouchCount > 1)
      {
        TouchCount = 1;
        if(BeepEnabled)
         BeepOn(0x200);
         EmulateBarrel = 1;
      }
      else
      {
        MarkSpot = TRUE;
        if(BeepEnabled)
         BeepOn(0x100);
      }
   }
   if(ByteBuffer[Z_HIGH_BYTE] & 0x20) // lift event occurred.
   {
      EmulateBarrel = 0;
      TouchCount = 0;
   }
   if(ByteBuffer[VALIDITY_BYTE] & 0x04) // proximity bit set ?
   {
      // in prox.
      if(touchDown)
      {
        last_tip_state = PDK_LEFT;
        touchDown = 0;
        xyunlocked = 1;
      }
      else
      {
        if( !(ByteBuffer[VALIDITY_BYTE] & 0x08)) // valid xy bit not set ?
           xyunlocked = 0;
      }
   }
   else // out of prox
```

-continued

```
{
    if(EmulateBarrel)
    {
        last_tip_state = PDK_UP;
        EmulateBarrel = 0;
    }
    else
    {
        ret_val = FF_SUCCESS | FF_OORPENPACKET;
        last_tip_state = PDK_OUTOFRANGE;
    }
    xyunlocked = 0;
}
if(xyunlocked)
{
    // read fresh x,y data from buffer.
            wticX =
            (long)((ByteBuffer[X_HIGH_BYTE] << 7) |
ByteBuffer[X_LOW_BYTE]);
            wticY =
            (long)(ByteBuffer[Y_HIGH_BYTE] << 7) |
ByteBuffer[Y_LOW_BYTE];
// Begin Touch Calibration
// Caution: the following has been carefully written not to overflow
//      32 bit signed long numbers with wticX and wticY ranging
//      from 0–16383 and constants such as channel gains,
//      sines and cosines scaled up to the 10000 range.
// first adjust
    Xadj = (wticX*JtouchCal.Scale_X)/10000L + JtouchCal.Off_X;
    Yadj = (wticy*JtouchCal.Scale_Y)/10000L + JtouchCal Off_Y;
// rotate
    Xrot =
    (Xadj*JtouchCal.Cos_B - Yadj*JtouchCal.Sin_B)/10000L;
    Yrot =
    (Xadj*JtouchCal.Sin_B + Yadj*JtouchCaI.Cos_B)/10000L;
    calX = (int) Xrot;
    calY = (int) Yrot;
// end calibrate
        // WTIC puts zero at bottom of screen.
            // Windows puts zero at top of screen.
            // Ergo, we need to invert the screen....
    last_Y = (WORD)(0x3FFF-calY);
} // end if xyunlocked
if(EmulateBarrel == 1)
{
    // This time, let current x,y data pass through.
    EmulateBarrel++;
}
else
if(EmulateBarrel == 2)
{
    EmulateBarrel++;
    last_tip_state = PDK_UP; // send Windows mouse button
up data to
            // cancel previous Left mouse down data.
}
else
if(EmulateBarrel == 3)
{
    last_X = MarkBarrelX; // use x,y data from first down event.
    last_Y = MarkBarrelY;
    last_tip_state = PDK_RIGHT; // send Windows right mouse data
}
if(MarkSpot)
{
    MarkSpot = FALSE;
    MarkBarrelX = last_X
    MarkBarrelY = last_Y
}
1ppp->wPDK = last_tip_state;
1ppp->wTabletX = last_X
1ppp->wTabletY = last_Y;
    return(ret_val);
}
```

What is claimed is:

1. A system for receiving input from at least one finger and providing mouse input to a program capable of receiving input from a mouse, the system comprising:

a display screen, a coordinate input device being operably integrated with said display screen for generating coordinate data in response to one or more fingers;

a controller operably connected to said display screen and said coordinate input device, said controller adapted to resolve mouse button events and respective coordinate data for such events; and an output operably connected to said controller for providing coordinate and mouse button selection data to said program;

wherein said mouse button events are resolved into left or right mouse button events on the basis of the number of fingers sensed by the coordinate input device, wherein said controller determines whether a user has selected a mouse button feature by counting a number of finger touch down events sensed by said coordinate input device, and wherein said controller resolves left and right mouse button touch down events by determining at least the following: (a) whether a touch down event has occurred; (b) if a touch down event has occurred whether more than one touch down event has occurred; (c) whether a touch lift event has occurred; and (d) if a touch lift event has occurred whether the touch lift was in proximity to a touch down event.

2. A system for receiving input from at least one finger and providing mouse input to a program capable of receiving input from a mouse the system comprising:

a display screen:

a coordinate input device being operably integrated with said display screen for generating coordinate data in response to one or more fingers;

a controller operably connected to said display screen and said coordinate input device, said controller adapted to resolve mouse button events and respective coordinate data for such events; and an output operably connected to said controller for providing coordinate and mouse button selection data to said program;

wherein said mouse button events are resolved into left or right mouse button events on the basis of the number of fingers sensed by the coordinate input device, wherein said controller determines whether a user has selected a mouse button feature by determining strength of the output of said coordinate input device, and wherein said controller resolves left and right mouse button touch down events by determining at least the following: (a) whether a touch down event has occurred; (b) whether a touch lift event has occurred; (c) if a touch down event has occurred whether more than one touch down event has occurred; and (d) if a touch lift event has occurred whether the touch lift was in proximity to a touch down event.

3. An apparatus for receiving, storing, displaying, and processing data, comprising:

(a) a touch screen capable of sensing a finger;

(b) a computer operably connected to said touch screen, said computer operating:

(i) a first software program operating on said computer, said software program capable of receiving input from a mouse;

(ii) a second software program for generating coordinate and related mouse data from fingers touching said touch screen;

(c) a controller operably connected to said touch screen and said computer, said controller adapted to resolve left mouse button and right mouse button touch down events and respective coordinate data for such events.

4. The apparatus of claim 3, wherein said number of fingers touching said touch screen is resolved by counting touchdown events.

5. The apparatus of claim 3, wherein the number of fingers touching said touch screen is resolved by signal strength of the output of said touch screen.

6. The apparatus of claim 3, wherein said computer is a general purpose computer.

7. The apparatus of claim 3, wherein said computer and said first software program operate in conjunction with an operating system producing an operating environment for operating said second software program.

8. The apparatus of claim 3, wherein said touch screen includes an electrostatic sensor.

9. The apparatus of claim 8, wherein said touch screen includes an indium-tin-oxide coating.

10. The apparatus of claim 8, wherein said electrostatic sensor is biased with an AC signal.

11. The apparatus of claim 10, wherein a finger is detected by said touch screen by measuring additional currents resulting from the added load of a finger touch on said touch screen.

12. A method for detecting an emulated mouse button event in a display system capable of receiving tactile input from a touch input device, the method comprising:

sending a data packet to a host computer for processing, the data packet being received from the touch input device and comprising coordinate and magnitude data relating to the tactile input and a switch variable having values indicative of a left mouse button event, a right mouse button event and no mouse button event;

detecting a finger touch down event based upon the coordinate and the magnitude data;

determining the finger touch down event being produced by more than one finger based upon the magnitude data upon detecting a finger touch down event;

setting the switch variable to a value indicating a right mouse button event upon determining the finger touch down event being produced by more than one finger;

setting the switch variable to a value indicating a left mouse button event upon determining the finger touch down event not being produced by more than one finger;

in the event that a finger touch down event is not detected, detecting a touch lift event based upon the coordinate data;

setting the switch variable to value indicating no mouse button event upon detecting a touch lift event;

determining the proximity of the coordinate data to previous coordinate data upon a touch lift event not being detected;

setting the switch variable to a value indicating no mouse button event upon determining the coordinate data not being proximate to previous coordinate data;

thereafter, determining the switch variable being set to a value indicating no mouse button event;

calculating new coordinate data upon determining the switch variable not being set to a value indicating no mouse button event; and otherwise repeating said sending step by relaying the coordinate and magnitude data and the switch variable to said host computer.

13. A method for detecting an emulated mouse button event in a display system capable of receiving tactile input from a touch input device, the method comprising:

sending a data packet to a host computer for processing, the data packet being received from the touch input device and comprising coordinate and touch count data relating to the tactile input, a switch variable having values indicative of a left mouse button event, a right mouse button event and no mouse button event, and a markspot variable marking the coordinate data;

detecting a finger touch down event based upon the coordinate data;

incrementing the touch count data upon detecting the finger touchdown event;

determining the count data being greater than one;

setting the touch count data to two and the switch variable to a value indicating a right mouse button event upon determining the touch count data being greater than one;

setting the switch variable to a value indicating a left mouse button event and the markspot variable to a value marking the coordinate data of the detected finger touch down event upon determining the touch count data not being greater than one;

in the event that a finger touch down event is not detected, detecting a touch lift event based upon the coordinate data;

setting the switch variable to a value indicating no mouse button event and setting the touch count data to zero upon detecting a touch lift event;

determining the proximity of the coordinate data to previous coordinate data upon a touch lift event not being detected;

setting the switch variable to a value indicating no mouse button event and setting the touch count data to zero upon determining the coordinate data not being proximate to previous coordinate data;

thereafter, determining the switch variable being set to a value indicating a left mouse button event;

calculating new coordinate data upon determining the switch variable being set to a value indicating a left mouse button event;

determining the markspot variable being set to a value marking the coordinate data of the detected finger touch down event;

storing the coordinate data and setting the markspot variable not marking the coordinate data of the detected finger touch down event upon determining the markspot being set to a value marking the coordinate data of the detected finger touch down event;

in the event the switch variable is determined to be not set to a value indicating a left mouse button event, determining the switch variable being set to a value indicating a right mouse button event;

restoring storing previous coordinate data upon determining the switch variable being set to a value indicating a right mouse button event; and otherwise repeating said sending step by relaying the coordinate and touch count data and the switch and markspot variables to said host computer.

* * * * *